(12) United States Patent
Behrens et al.

(10) Patent No.: US 11,651,626 B2
(45) Date of Patent: May 16, 2023

(54) METHOD FOR DETECTING OF COMPARISON PERSONS TO A SEARCH PERSON, MONITORING ARRANGEMENT, IN PARTICULAR FOR CARRYING OUT SAID METHOD, AND COMPUTER PROGRAM AND COMPUTER-READABLE MEDIUM

(71) Applicant: Robert Bosch GmbH, Stuttgart (DE)

(72) Inventors: Holger Behrens, Munich (DE); Joerg Staudigel, Eckental (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 17/324,347

(22) Filed: May 19, 2021

(65) Prior Publication Data

US 2021/0365715 A1    Nov. 25, 2021

(30) Foreign Application Priority Data

May 20, 2020 (DE) ..................... 10 2020 206 350.8

(51) Int. Cl.
*G06V 40/20* (2022.01)
*G06V 30/242* (2022.01)
(Continued)

(52) U.S. Cl.
CPC .......... *G06V 40/20* (2022.01); *G06F 18/2413* (2023.01); *G06V 10/75* (2022.01); *G06V 10/764* (2022.01); *G06V 30/242* (2022.01)

(58) Field of Classification Search
CPC ...... G06K 9/627; G06V 30/242; G06V 40/20; G06V 10/75; G06V 10/764; G06V 40/16; G06V 20/00; G08B 13/19686
See application file for complete search history.

(56) References Cited

U.S. PATENT DOCUMENTS 10,885,099 B1 *  1/2021  Price ................. G06F 16/51
2006/0120571 A1   6/2006  Tu et al.
(Continued)

FOREIGN PATENT DOCUMENTS

DE          10158990 C1     4/2003

OTHER PUBLICATIONS

Khan et al., "Human Tracking in Multiple Cameras," Eighth IEEE International Conference on Computer Vision, 2001, vol. 1, 6 pages.
(Continued)

*Primary Examiner* — Md K Talukder
(74) *Attorney, Agent, or Firm* — Michael Best & Friedrich LLP

(57) ABSTRACT

A method for detecting comparison persons 7 to a search person 4, wherein a plurality of classification persons 3 is classified by extracting values W1,W2,W3 for classification features K1,K2,K3 from classification images 2 of the classification persons 3, the classification being ambiguous in such a way that the classification does not enable a unique identification of any of the classification persons 3, wherein during a search for a search person 4 using a search image 5 by a comparison of values of search features from the search image 5 with values W1,W2,W3 of classification features K1,K2,K3, at least two classification persons 3 are output as comparison persons 7.

14 Claims, 3 Drawing Sheets

(51) Int. Cl.
  *G06F 18/2413* (2023.01)
  *G06V 10/75* (2022.01)
  *G06V 10/764* (2022.01)

(56) References Cited

U.S. PATENT DOCUMENTS

| | | |
|---|---|---|
| 2012/0026335 A1 | 2/2012 | Brown et al. |
| 2012/0030208 A1 | 2/2012 | Brown et al. |
| 2013/0155229 A1* | 6/2013 | Thornton ............... H04N 7/18 |
| | | 348/143 |
| 2013/0170696 A1* | 7/2013 | Zhu ..................... G06V 10/75 |
| | | 382/103 |
| 2015/0332463 A1* | 11/2015 | Galera ............... G05B 19/048 |
| | | 382/103 |
| 2016/0012280 A1* | 1/2016 | Ito ..................... G06V 40/173 |
| | | 382/305 |
| 2017/0099200 A1* | 4/2017 | Ellenbogen ............. G06N 7/01 |
| 2018/0225842 A1* | 8/2018 | Wang .................. G06V 40/169 |
| 2018/0285668 A1* | 10/2018 | Li ........................ G06V 10/50 |
| 2019/0385283 A1* | 12/2019 | McCloskey ............. G06T 5/003 |
| 2022/0114381 A1* | 4/2022 | Watanabe ............. G06V 10/40 |

OTHER PUBLICATIONS

Ribaric et al., "An Overview of Face De-identification in Still Images and Videos," 11th IEEE International Conference and Workshops on Automatic Face and Gesture Recognition, 2015, vol. 4, 6 pages.

* cited by examiner

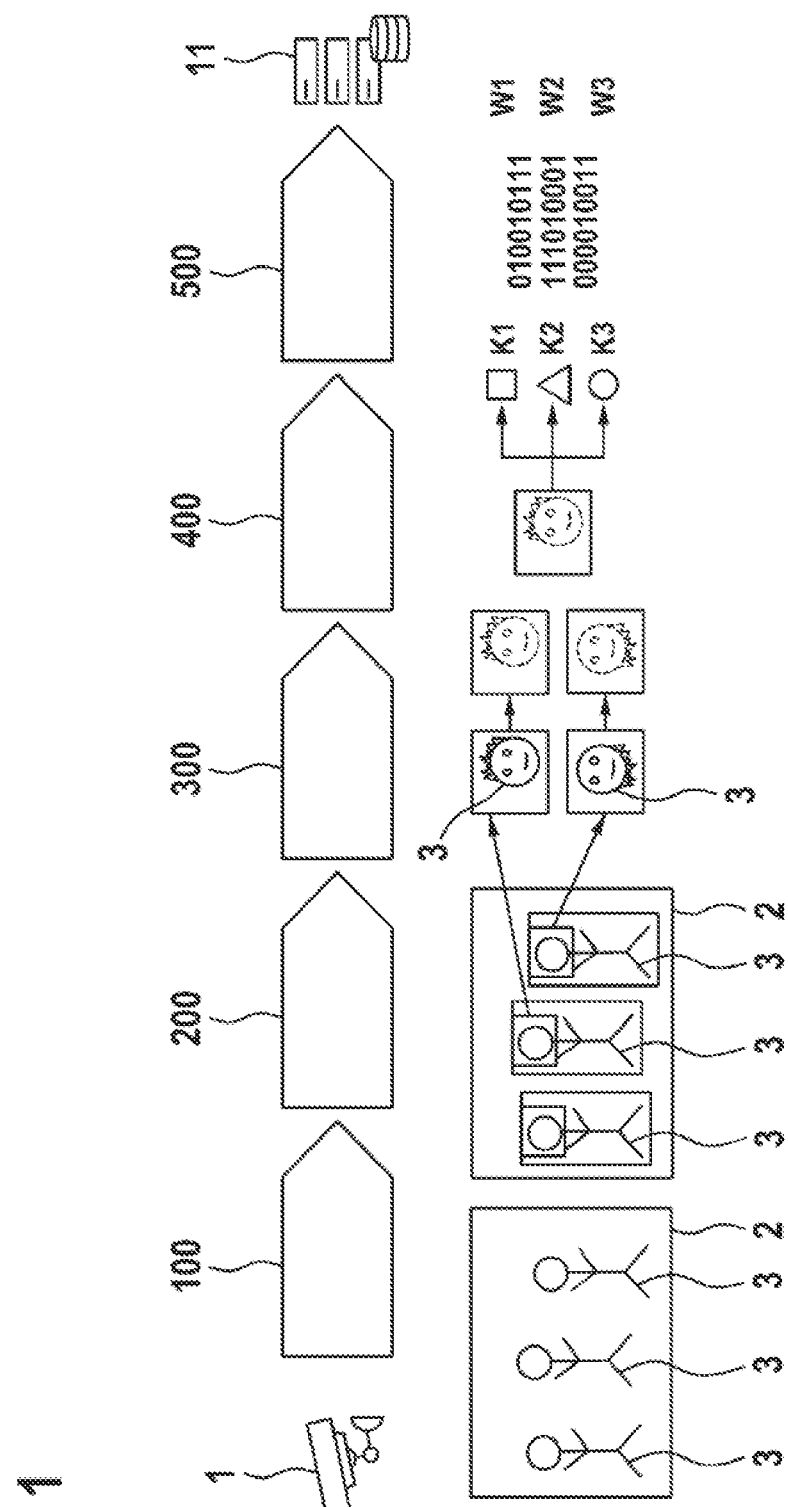

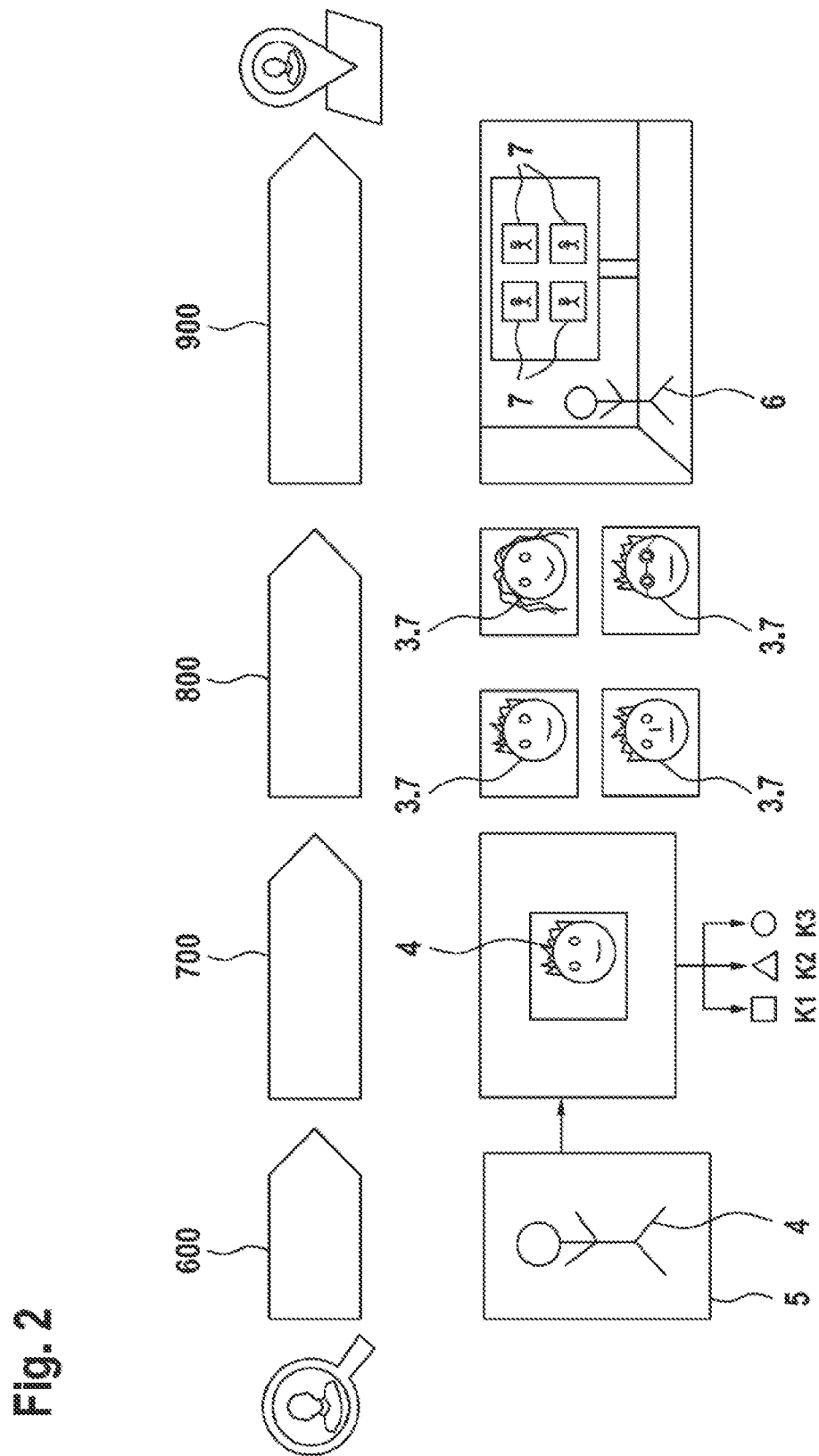

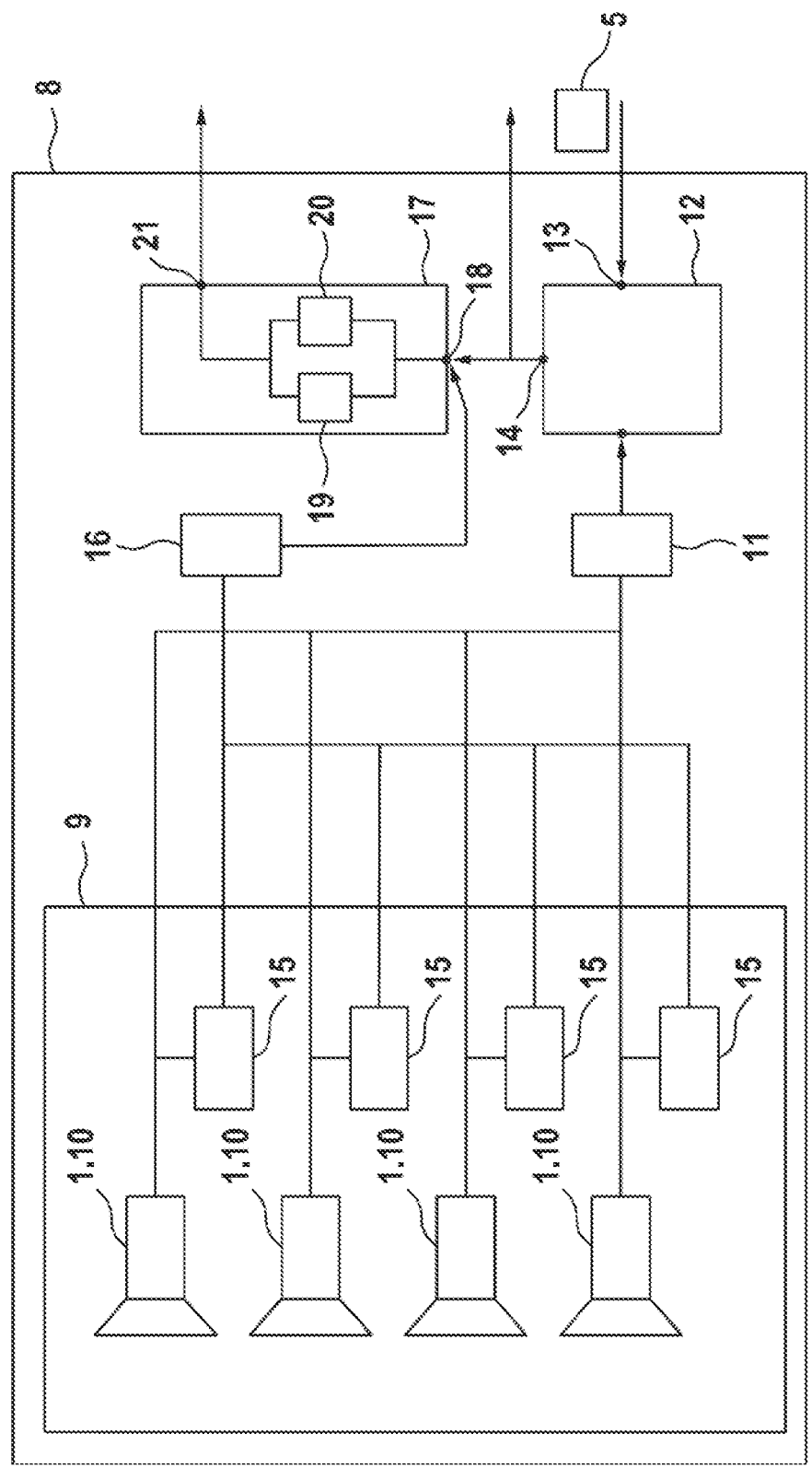

METHOD FOR DETECTING OF COMPARISON PERSONS TO A SEARCH PERSON, MONITORING ARRANGEMENT, IN PARTICULAR FOR CARRYING OUT SAID METHOD, AND COMPUTER PROGRAM AND COMPUTER-READABLE MEDIUM

BACKGROUND OF THE INVENTION

From a technical point of view, person recognition has become increasingly powerful in recent decades, wherein in many cases, particularly where neural networks are used, the detection and/or tracking of persons functions without errors.

While the technology has thus become increasingly powerful, concerns have been raised regarding the far-reaching use of personal data in society, which is also recognized and taken into account in technological development.

A very early example of a video monitoring system which respects personal privacy is given by the publication DE 101 589 90 C1, which probably forms the closest prior art. This publication discloses a video monitoring system used to mask objects in a monitored scene that relate to a person's privacy. Such objects include vehicle registration plates or the person him/herself.

SUMMARY OF THE INVENTION

The subject matter of the invention is a method for detecting comparison persons to a search person, a monitoring arrangement for detecting comparison persons to a search person, as well as a computer program and a computer-readable medium. Preferred or advantageous embodiments of the invention are obtained from the subclaims, the following description and the attached figures.

The object of the invention is a method that implements or comprises the detection of comparison persons to a search person.

The method can be used in particular in monitored areas in public or private spaces and/or buildings or facilities, wherein people may be present in the monitored area. Examples of such monitored areas are railway stations, airports, but also public buildings such as courts, public authorities, or open spaces such as pedestrian zones, marketplaces or the like.

In the method a plurality of persons in the monitored area are classified as classification persons by extracting values for classification features. The values are extracted from one or more classification images of the classification persons. Thus, it is possible that for a classification subject, exactly one classification image or a plurality of classification images or a sequence, in particular a chronological sequence, can be used for extracting the values. For example, the values may be formed by feature vectors of the classification features. The classification images of the classification persons are preferably obtained from a number of monitoring cameras, these monitoring cameras being distributed around the monitored area.

It is provided that the classification is ambiguous, in such a way that the classification does not allow a unique identification of any of the classification persons. The ambiguity can be artificially generated from the image quality of the at least one classification image and by the selection and/or definition of the classification features.

Preferably, for each classification person at least or exactly one additional person with the same values for the classification features is provided, or at least with the same classification, in order to ensure the ambiguity.

In the method, at least one or exactly one search image is used in searching for a search person. This means that for the search person exactly one search image, a plurality of search images or a sequence, in particular a chronological sequence, can be used for the at least one search image. Values of search features are extracted from the at least one search image. Preferably, the search features comprise or are formed by the classification features.

A comparison is made between the values of search features from the search image and values of classification features of the persons, wherein at least two persons are output from the comparison as comparison persons. The comparison can be implemented by a neural network, for example. Outputting at least two comparison persons is a means for implementing the ambiguity of the classification. In particular, at least two comparison persons are output in each such search, so that this method step ensures that no unambiguous identification of the search person is possible.

It is a consideration of the invention that the ambiguous classification in searching for a search person is intended to achieve an ambiguous and not an unambiguous result for the search person. On the one hand, this means that not only is a quasi-identical person output as a comparison person, but also similar comparison persons, with the result that in this method step the selection of the persons is expanded and thus a broader, more comprehensive result is generated.

Alternatively or in addition, the invention reflects data protection requirements, in particular Art. 9(1) of GDPR, which restricts the processing of biometric data and, in particular, prohibits the processing of biometric data which allows a unique identification of a person, without consent or other general conditions which are not normally satisfied in such a monitored area. Thus, the invention ensures that no biometric data is used which enables a unique identification of a person.

Preferably, the at least two comparison persons are output by data processing means, for example displayed on a screen, printed on a printer, etc.

In a preferred design of the invention, the classification images have an image quality that is actively reduced, in particular degraded. On the one hand, it is possible that the image quality is actively degraded by having the monitoring cameras acquire the classification images with a degraded image quality. For example, the classification images can be acquired at a resolution which is lower than the potential resolution of the monitoring cameras. Alternatively or in addition, the classification images can be acquired in a degraded form, in particular defocused and thus blurred. Thus, the image quality of the classification images is degraded compared to a possible image quality of the classification images.

On the other hand, it is possible that the classification images are acquired with a better image quality and then are subsequently actively reduced in quality, in particular degraded. The degradation of the classification images can be achieved, for example, by a subsequent reduction of the resolution. Alternatively or in addition, the classification images can be provided with a blur effect and/or defocusing and/or reduced sharpness. Thus, the image quality of the classification images is degraded compared to an actual image quality of the classification images.

In principle, the degradation of the image quality can apply to the entire classification image, and this can be implemented particularly easily using data processing means and/or by physical means. However, in a preferred extension of the invention, only a subregion of the classification image has its image quality degraded, whereas the remaining area remains unchanged or less degraded. In particular, the subregion images a head of the person, so that the person is masked by image-degradation.

These measures are based on the consideration that the degradation of the image quality is used to establish or partly establish the ambiguity of the classification.

In a possible extension of the invention, the selection and/or definition of the classification features is limited compared to a possible selection and/or definition of the classification features, in order to establish or partly establish the ambiguity of the classification. This design is based on the consideration that, on the one hand, it is possible to degrade the image quality of the classification image in such a way that a unique identification of any of the persons is no longer possible. Alternatively or in addition, however, the selection and/or definition of the classification features can be limited in such a way that it is no longer possible to uniquely identify the person. In principle, this can also be implemented with a non-degraded classification image. Two measures are thus specified, one of which involves degrading the classification image and the other involves a deterioration in the classification of the classification image. Both measures can be combined, thus achieving the objective of preventing a unique identification of any of the persons.

In a preferred extension of the invention, the classification images originate from a plurality of monitoring cameras. For the classification persons, individual trajectories are formed from classification images, wherein the classification images for an individual trajectory each originate from a single monitoring camera. The individual trajectories can be formed by the fact that although the classification is ambiguous, the person can be reliably tracked as an unidentified object via the classification images from a single monitoring camera—for example, similarly to a moving object (suitcase, bag, etc.). The formation of the individual trajectory means that further information about the classification person is collected, but it is not in the form of biometric data. At a minimum, the individual trajectories improve the selection of classification images for the classification of the respective person.

In a preferred extension of the invention, a collective trajectory for one of the comparison persons or classification person is formed from at least two individual trajectories of different monitoring cameras. However, more than two individual trajectories from different monitoring cameras can also be used to form the collective trajectory. The collective trajectory is determined by taking into account physical laws and/or probabilities. For example, it exploits the fact that the respective comparison person or classification person, when leaving a section of the monitored area which is monitored by one of the monitoring cameras, enters a section of the monitored area of another monitoring camera according to certain physical laws and/or probabilities. Since the individual trajectories carry time information for the persons and the relative position of the monitoring cameras in the monitored area are known and/or the individual trajectories are represented in the monitored area, it is a simple task to distribute the individual trajectories over the comparison persons or classification persons in a meaningful way.

In a possible design of the invention, a probability graph is formed on the basis of the comparison persons or classification persons and their associated individual trajectories, wherein a or the collective trajectory forms a possible trajectory in the probability graph.

With this extension, the method allows not only comparison persons to a search person to be detected, but also a collective trajectory through the monitored area to be determined for the respective comparison person. This means that detection and, optionally, tracking of comparison persons to a search person can be implemented securely under data protection law.

A further object of the invention is formed by a monitoring arrangement for detecting comparison persons to a search person. In particular, the monitoring arrangement for the method is designed according to the invention. The monitoring arrangement is preferably designed as a digital data processing system, which can comprise one or more digital data processing devices, in particular computers.

The monitoring arrangement comprises a classification system for the classification of a plurality of persons as classification persons. The classification persons are classified by extracting values for classification features from classification images of the classification persons. The classification is ambiguous, so that the classification does not allow a unique identification of any of the classification persons. The classification system can be designed as a central data processing system or as a plurality of decentralized data processing systems. For example, the classification system can be implemented or at least supported by data processing systems in the monitoring cameras. This has the advantage that the monitoring cameras only output the classification features, which does not allow a unique identification of any of the classification persons.

The monitoring arrangement has a search device for searching for the search person, wherein at least two classification persons are output as comparison persons via a search image by comparing values of search features from the search image with values of classification features. Preferably, the search device has a digital data processing system which is particularly preferably designed as a central data processing system.

Particularly preferably, it is provided that the search device has a search input interface for receiving the search image of a search person, and a search output interface for outputting at least two comparison persons.

In the method and/or in the monitoring arrangement, the search image may also be actively degraded, but the search image with the possible or actual image quality is preferably used.

In a preferred extension of the invention, the classification system comprises a plurality of monitoring cameras for recording the classification images, wherein the monitoring cameras cover different sections of the monitored area. The different sections can be arranged to be spaced apart from one another or overlapping.

In a preferred extension of the invention, the classification system has at least one degradation module for degrading the image quality of the classification images. Preferably, such a degradation module is arranged in each of the monitoring cameras, so that this method step is implemented in the monitoring cameras in a decentralized manner. As an alternative, however, the classification images can be first transferred to the degradation module.

It is particularly preferred that the classification system comprises at least one individual trajectory module for forming an individual trajectory of a classification subject from classification images from a single monitoring camera. Preferably, such an individual trajectory module is arranged in each of the monitoring cameras, so that this method step is implemented in the monitoring cameras in a decentralized manner. As an alternative, however, the classification images can first be transferred to the individual trajectory module. The single trajectory module preferably comprises a trajectory output interface to output the individual trajectories.

Preferably, the monitoring arrangement comprises a collective trajectory device for creating a or the collective trajectory of the classification persons, which is connected to the trajectory output interface and the search output interface for data transfer. The collective trajectory device comprises a determination module for determining the collective trajectory, as was described earlier. It is possible that the collective trajectory device outputs the collective trajectory or the probability graph described above.

A further object of the invention relates to a computer program and to a computer-readable medium.

The invention can optionally be summarized as follows: the proposed method and/or the proposed monitoring arrangement provides a list of comparison persons belonging to the same classification as the search person. This reduces the search space for a monitored person and thus increases the time available to the operating personnel to locate the position of the search person. Since the method and/or the monitoring arrangement neither stores nor processes data that would allow a unique identification of persons in the classification images, data conformity is assured.

A monitored area, such as an airport, is monitored by a plurality of cameras. Video data processing devices provide information about the position of classification persons, such as 3D-foot points of the classification persons from calibrated cameras, and values for classification features such as facial or bodily characteristic vectors. It is possible to create an individual trajectory for a classification subject from the field of view of a single monitoring camera. The individual trajectories of the classification person as well as the values of the classification features are stored in databases. Based on the similarity between the classification features between the search person and the classification persons, correlations between the individual trajectories can be derived in the form of a collective trajectory or a probability graph. The probability graph can be evaluated to derive a collective trajectory that extends across a plurality of monitoring cameras. In order both to minimize the degradation and to ensure data security, the method and/or the monitoring arrangement can be qualified with extensive test data. Statistical means can be used to achieve optimum coordination.

BRIEF DESCRIPTION OF THE DRAWINGS

Further features, advantages and effects of the invention are derived from the following description of preferred exemplary embodiments of the invention and from the accompanying figures. In the figures:

FIG. 1 shows a flowchart for the extraction of values of classification features as an exemplary embodiment of the invention;

FIG. 2 shows a flowchart of the search for a search person as an exemplary embodiment of the invention;

FIG. 3 shows a schematic block diagram of a monitoring arrangement for implementing the method.

DETAILED DESCRIPTION

FIG. 1 shows a flowchart of the extraction of values of classification features.

In a step 100, video data is captured in a monitored area via monitoring cameras 1 and from it classification images 2 with classification persons 3 are generated.

In an optional step 200, a contour detection of the classification persons 3 is performed, which is implemented, for example, by forming boxes ("bounding boxes").

Then, the head regions of the classification persons 3 are determined as subregions of the classification images 2.

In a step 300, at least or only the head regions of the classification persons 3 in the classification image 2 are degraded. This can be achieved, e.g., by degradation of the image quality or an artificial blurring.

In a step 400, values W1, W2, W3 for classification features K1, K2, K3 are calculated from the classification images 2, wherein the classification diagrams 2 are degraded, at least in the head region of the persons 3. The selection and/or definition of the classification features K1, K2 and K3 and the degree of degradation of the classification images 2 are coordinated in such a way that the classification does not permit a unique identification of any of the persons 3.

In a step 500, the values W1, W2, W3 of the classification features K1, K2 and K3 are stored in a first database 11 or forwarded for further processing.

FIG. 2 shows a flowchart of the process of searching for a search person 4 in the monitored area.

In a step 600, the search person 4 is defined by a search image 5. The search image 5 can be an image from the monitoring cameras 1 on which the search person 4 is displayed. The search person 4 can be selected among multiple persons in the search image 5, for example by means of a human-machine interface, such as a computer mouse, a touchpad etc. Alternatively, it is possible that the search image 5 with the search person 4 is supplied via a network, for example by investigating authorities.

In a step 700, values for the classification features K1, K2, K3 are determined as search features from the search image 5, in particular from the head region as a subregion of the search image 5. The values for the classification features K1, K2, K3 in the search image 5 are determined without degradation. In alternative exemplary embodiments, a degradation can be carried out as in the classification images 2.

In a step 800, the system searches the classification images 2 for classification persons 3 as comparison persons 7, which are classified into the corresponding classes using the values of the classification features K1, K2, K3. Since the classification of the persons 3 was ambiguous, at least two comparison persons 7 are returned as the result of the search, which thus does not produce a unique result.

In a possible step 900, the comparison persons 7 are indicated to the monitoring personnel 6, who manually select one of the comparison persons 7 as the search person 4.

The method described prevents the violation of legal data protection conditions with regard to biometric data.

FIG. 3 shows a highly schematized view of a monitoring arrangement 8 as a further exemplary embodiment of the invention. The monitoring arrangement 8 is used for detecting comparison persons 7 to a search person 4. In particular, the monitoring arrangement 8 implements the method according to FIGS. 1 and 2.

The monitoring arrangement 8 comprises a classification system 9. The classification system 9 comprises a plurality of the monitoring cameras 1 which are directed at the monitored area, each of the monitoring cameras 1 covering a section of the monitored area. The sections can be overlapping or spaced apart from one another.

The classification system 9 is designed in software and/or circuit technologies to extract values for the classification features K1, K2, K3 of the persons 3 from the classification images 2 which are acquired by the monitoring cameras 1. In order to implement step 300, the degradation of the classification images 2, the classification system 9 comprises at least one degradation module 10, wherein in the present exemplary embodiment the degradation modules 10 are integrated into the monitoring cameras 1. In the present exemplary embodiment, the monitoring cameras 1 are designed to degrade the classification images 2 with regard to their image quality and to extract the values for the classification features K1, K2, K3 of the persons 3 and thus classify the persons 3 in an ambiguous manner.

The values of the classification features K1, K2, K3 or, expressed succinctly, the classification, in particular the ambiguous classification, is stored in the first database 11.

The monitoring arrangement 8 comprises a search device 12, wherein the search device 12 is designed to output at least two classification persons 3 as comparison persons 7 on the basis of the search image 5 by comparing the values of search features from the search image 5 with values of classification features K1, K2, K3. The search is carried out, for example, by using neural networks and/or artificial intelligence. The search device 12 has a search input interface 13 for receiving the search image 5. As already explained in connection with FIG. 2, the search input interface 13 can be a data interface for receiving external data, or else a human-machine interface for selecting the search person 4 and thus the search image 5.

The search device 12 is designed in software and/or circuit technologies to extract the values for the search features from the search image 5 for the search person 4. The search device 12 is linked to the first database 11 for data transfer, so that the values for the search features can be compared with the values for the classification features. As a result, the search device 12 returns at least two persons 3 as comparison persons 7.

The search device 12 comprises a search output interface 14, via which the comparison persons 7 can be output. The search output interface 14 can be designed as a human-machine interface, such as a display screen. The final selection of the search person 4 from the comparison persons 7 is carried out by the monitoring personnel 6.

Optionally, the monitoring arrangement 8, in particular the classification system 9, comprises at least one individual trajectory module 15, which is designed in software and/or circuit technologies to form an individual trajectory of a classification person 3 from the classification images 2 from a single monitoring camera 1. The individual trajectory uses data processing means to describe a space-time curve of the classification person 3 in a single section of the monitored area, captured by a single monitoring camera 1. The individual trajectory module 15 can be designed as a central module; in this case, each monitoring camera 1 is assigned an individual trajectory module 15. Alternatively, the individual trajectory module 15 can also be integrated in the monitoring camera 1.

The individual trajectories are transferred from the individual trajectory module 15 to a second database 16. The individual trajectories form additional data relating to the classification persons 3. For example, the individual trajectories for the comparison persons 7 can be retrieved and/or output.

Optionally, the monitoring arrangement 8 comprises a collective trajectory device 17 for creating a collective trajectory of the comparison persons 7. The collective trajectory device 17 comprises a collective input interface 18, via which the comparison persons 7 and the individual trajectories for the respective comparison persons 7 can be transferred from the second database 16. The collective trajectory is defined as a combination of at least two individual trajectories, which is assigned to the same classification person 3 and/or comparison person 7.

The collective trajectory device 17 comprises a determination module 19 for determining the collective trajectory for the respective comparison person 7. The determination module 19 is therefore provided with the at least two comparison persons 7 as well as the individual trajectories for the at least two comparison persons 7. The problem is that the assignment of the individual trajectories to the comparison persons 7 is initially ambiguous. However, using a priori knowledge, such as physical laws or probabilities, the determination module 19 can correctly assign the individual trajectories to the comparison persons 7 and thereby determine the collective trajectory. For example, it exploits the fact that the comparison persons 7 must switch from one section of the monitored area into an adjacent section. It can also take into account the fact that the comparison persons 7 cannot suddenly travel from one end of the monitored area to another end of the monitored area. By taking this a priori knowledge into account, the individual trajectories can thus be correctly assigned and the collective trajectory generated.

In the event that a correct assignment is not possible despite taking into account the a priori knowledge, the collective trajectory device 17 comprises a probability module 20, wherein the probability module 20 is designed in software and/or circuit technology to form a probability graph in which the individual trajectories of the comparison persons are entered by data-processing means or in graphical form. This allows the collective trajectories to be determined by determining probability values for the transition from one individual trajectory to the next individual trajectory, and the collective trajectory is determined by selecting individual trajectories with the highest probability values. It is also possible that variants of collective trajectories are determined in this way, although they have different probabilities. It is also possible that, based on a single trajectory, a decision tree is constructed as a probability graph and thus collective trajectories with different probabilities are formed.

The collective trajectory device 17 comprises a collective output interface 21, via which the collective trajectories and/or the probability graph can be output. The collective output interface 21 can be connected to a human-machine interface for displaying the collective trajectories and/or the probability graph.

The invention claimed is:

1. A method for detecting comparison persons to a search person, the method comprising:
   degrading classification images of classification persons resulting in a degradation of distinct classification features, wherein the degraded distinct classification features inhibit a unique identification of an individual,
   classifying a plurality of the classification persons by extracting values for classification features from the classification images of the classification persons, wherein the classification is ambiguous and does not enable the unique identification of any of the classification persons,
   performing a search for a search person via a search image by comparing values of search features from the search image with values of classification features, creating a respective collective trajectory for comparison persons through a monitored area based on respective individual trajectories of the comparison persons associated with a first section and a second section of the monitored area, wherein the first section and the second section are adjacent within the monitored area, and outputting at least two classification persons as the comparison persons and the respective collective trajectory.

2. The method according to claim 1, wherein the selection and/or definition of the classification features is limited compared to a possible selection and/or definition of the classification features.

3. The method according to claim 1, wherein the classification images originate from a plurality of monitoring cameras, wherein for the classification persons an individual trajectory is formed from classification images, wherein the classification images each originate from a single monitoring camera.

4. The method according to claim 3, wherein one of the respective collective trajectory for one of the comparison persons is formed from at least two individual trajectories from different monitoring cameras, the collective trajectory being determined by taking into account physical laws and/or probabilities.

5. The method according to claim 3, wherein a probability graph is formed on the basis of the comparison persons and their associated individual trajectories, wherein the collective trajectory forms a possible trajectory in the probability graph.

6. A monitoring arrangement for detecting comparison persons to a search person, the monitoring arrangement comprising:

a classification system for degrading classification images of classification persons resulting in a degradation of distinct classification features, wherein the degraded distinct classification features inhibit a unique identification of an individual and classifying a plurality of the classification persons, wherein the classification persons are classified by extracting values for classification features from the classification images of the classification persons, wherein the classification is ambiguous and does not enable the unique identification of any of the classification persons, a collective trajectory device configured to create a respective collective trajectory for comparison persons through a monitored area based on respective individual trajectories of the comparison persons associated with a first section and a second section of the monitored area, wherein the first section and the second section are adjacent within the monitored area, and a search device for searching for the search person and configured to compare values of search features from a search image with values of classification features and output at least two classification persons as the comparison persons.

7. The monitoring arrangement according to claim 6, wherein the classification system comprises a plurality of monitoring cameras for recording the classification images, wherein the monitoring cameras cover different sections of a monitored area.

8. The monitoring arrangement according to claim 6, wherein the classification system comprises at least one degradation module for degrading the image quality of the classification images.

9. The monitoring arrangement according to claim 6, wherein the classification system comprises at least one individual trajectory module for forming a single trajectory of a classification person from classification images from a single monitoring camera.

10. The monitoring arrangement according to claim 6, wherein the search device has a search input interface for receiving a search image of a search person, and a search output interface for outputting at least two comparison persons.

11. The monitoring arrangement according to claim 6, wherein the collective trajectory device has a collective input interface for receiving the comparison persons and the individual trajectories of the comparison persons, and a collective output interface for outputting the respective collective trajectory for the comparison persons.

12. The monitoring arrangement according to claim 11, wherein the collective trajectory device has a determination module for determining the respective collective trajectory taking into account physical laws and/or probabilities.

13. The monitoring arrangement according to claim 12, wherein the collective trajectory device has a probability module for determining a probability graph for the respective collective trajectories.

14. A non-transitory, computer-readable medium containing instructions that when executed by a computer cause the computer to degrade classification images of classification persons resulting in a degradation of distinct classification features, wherein the degraded distinct classification features inhibit a unique identification of an individual, classify a plurality of the classification persons by extracting values for classification features from the classification images of the classification persons, wherein the classification is ambiguous and does not enable the unique identification of any of the classification persons, perform a search for a search person via a search image by comparing values of search features from the search image with values of classification features, create a respective collective trajectory for comparison persons through a monitored area based on respective individual trajectories of the comparison persons associated with a first section and a second section of the monitored area, wherein the first section and the second section are adjacent within the monitored area, and output at least two classification persons as the comparison persons and the respective collective trajectory.

* * * * *